Figure 1:
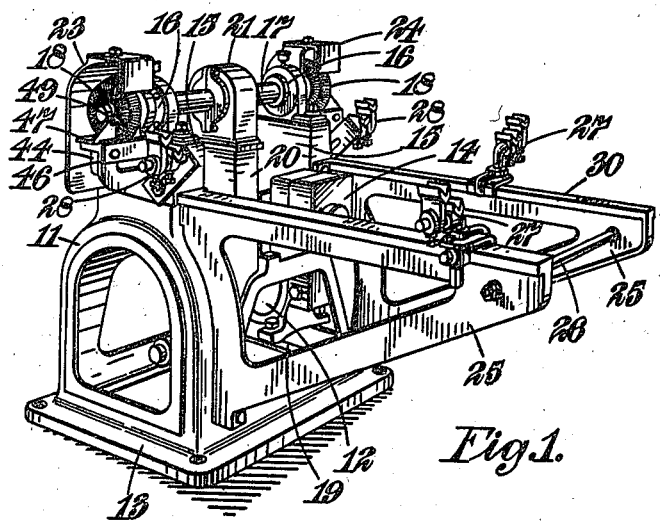

July 14, 1936.                J. RULE                    2,047,836
                          MILLING MACHINE
                       Filed Sept. 25, 1934      3 Sheets-Sheet 1

INVENTOR
James Rule
By his atty's

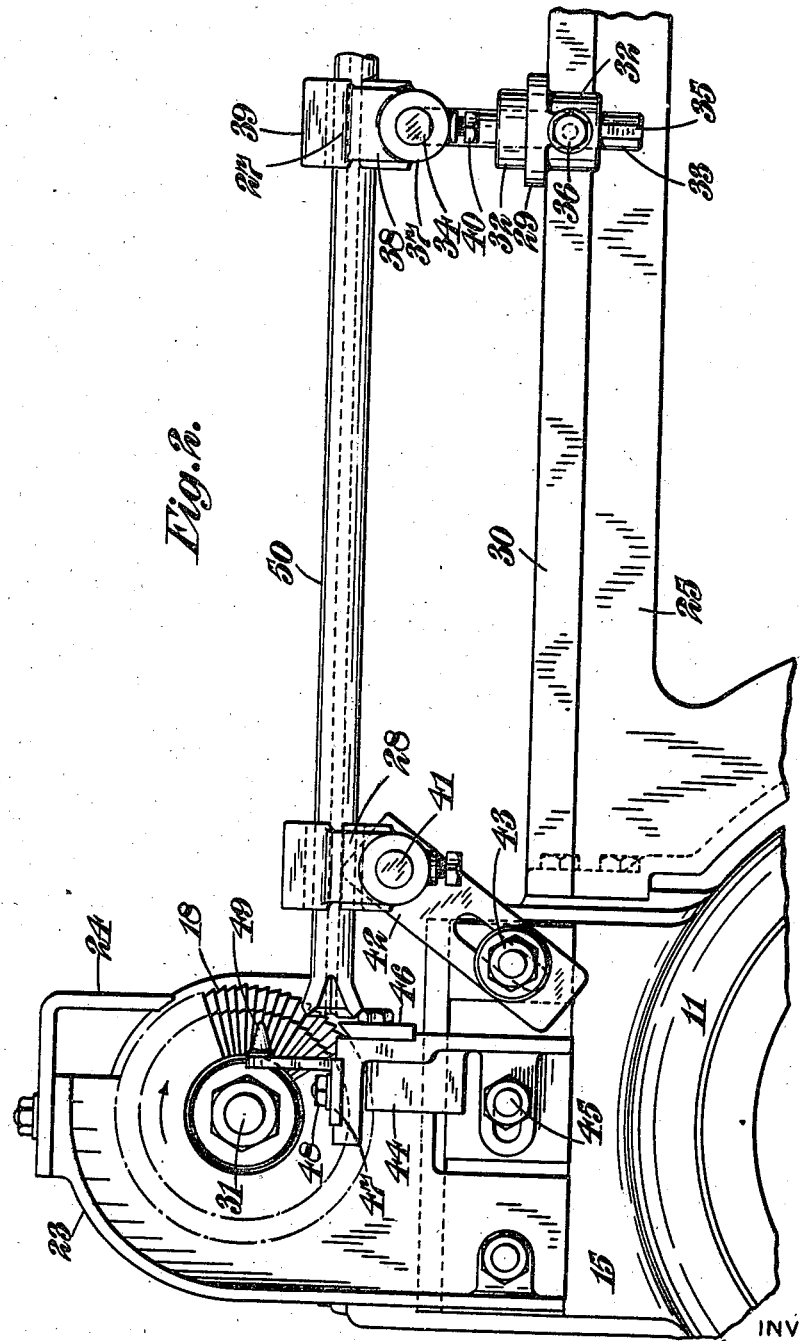

July 14, 1936.  J. RULE  2,047,836
MILLING MACHINE
Filed Sept. 25, 1934   3 Sheets-Sheet 3

INVENTOR
James Rule
by his attys
Byrnes, Stebbins & Blenko

Patented July 14, 1936

2,047,836

UNITED STATES PATENT OFFICE 2,047,836

MILLING MACHINE

James Rule, Camborne, Cornwall, England, assignor to Holman Brothers Limited, Camborne, Cornwall, England, a British company Application September 25, 1934, Serial No. 745,431
In Great Britain October 3, 1933

6 Claims. (Cl. 90—18)

The present invention relates to milling machines of the type in which a milling cutter operates on a work-piece at an elevated temperature and this type of machine is designated throughout the following specification by the phrase "hot milling machine".

According to the invention a hot milling machine for sizing drill bits comprises in combination a milling cutter and means to guide the drill bit for longitudinal movement to permit the bit to be moved to bring the portions to be milled into engagement with the cutting face of the milling cutter.

The object of the present invention is to provide a machine for finishing off rock drill bits made or resharpened in a drill sharpening machine by removing the decarbonized skin formed on the drill steel when it is heated to a forging temperature. A milling machine according to the invention may be used for example to size double-taper rock drill bits accurately and more rapidly than can be done in a drill sharpening machine.

According to the invention also a hot milling machine for sizing the heads of drill bits comprises a milling cutter and means for engaging the end of a drill bit head to centre the bit in correct relation to the cutter for producing the desired finished size of the milled drill bit.

The end centre in such constructions is preferably adjustable in relation to the cutter and conveniently comprises a conical member secured to a bracket mounted on a framework carrying the milling cutter, and which conical member is adapted to engage a recess (e. g. the end of the central longitudinal hole in a hollow drill steel) in the end of the drill bit. In such a construction the bracket carrying the conical member is conveniently mounted to be adjustable towards and away from the milling cutter, and is preferably mounted to be adjustable in at least two mutually perpendicular directions.

A hot milling machine according to the invention may conveniently be constructed to have a milling cutter or cutters of such a shape that the cutting edges of the drill bit may also be milled by the machine in addition to the sizing operation carried out thereby.

In order that the invention may be more clearly understood a specific example of such a machine constructed in accordance with the present invention will now be described, with reference to the accompanying drawings in which:—

Figure 4:
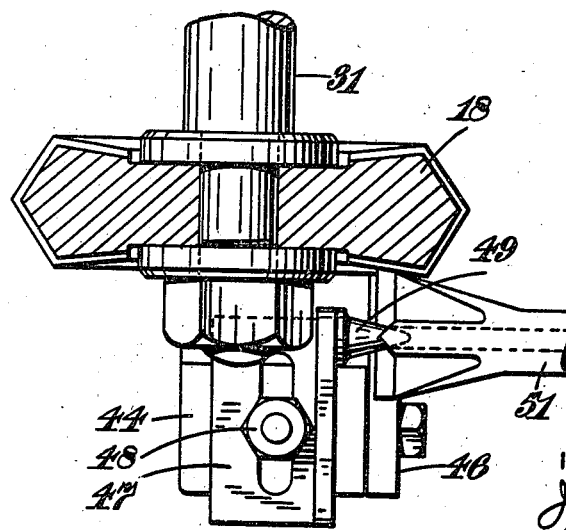
Figure 3:
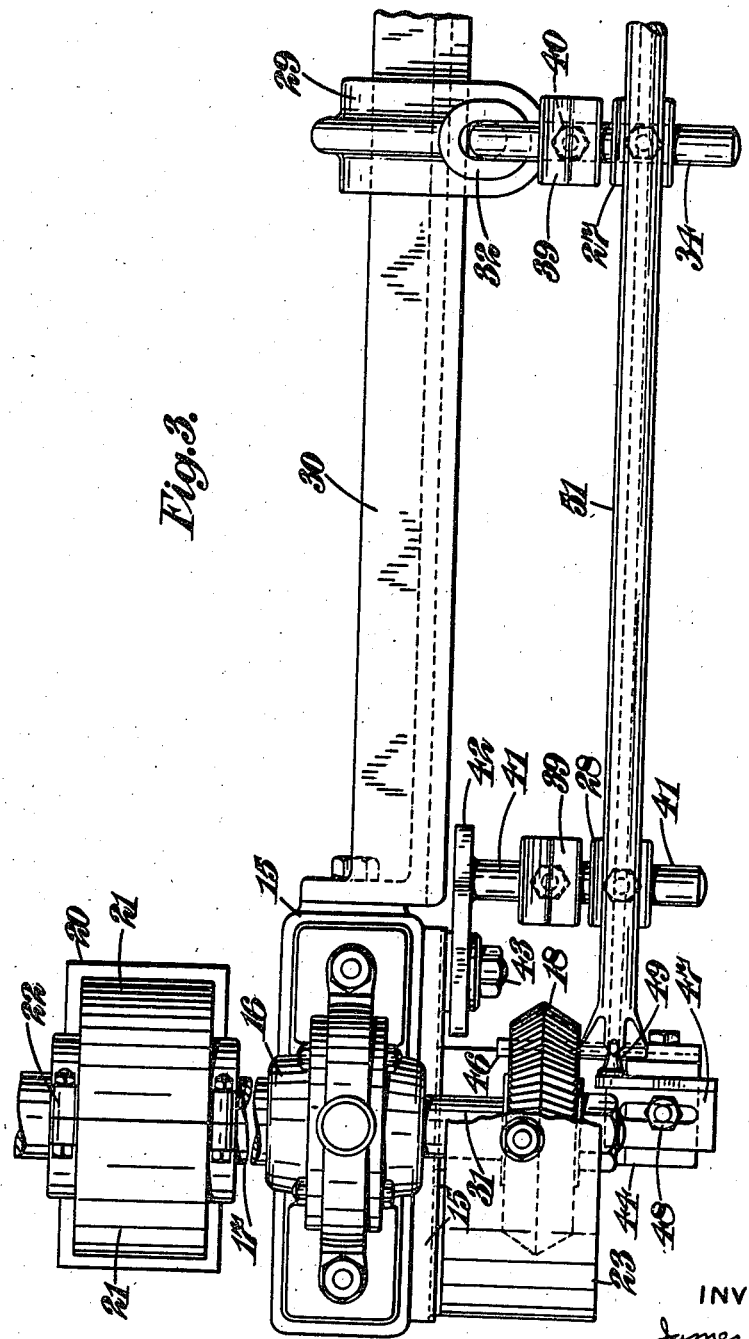

Figure 1 is a perspective view of the machine,
Figure 2 is a side view of devices for carrying a drill steel and showing a drill bit applied to the milling cutter so as to mill the cutting edges of the bit, Figure 3 is a plan view of the drill supports showing a drill applied to the milling cutter so as to size the drill and, Figure 4 is a plan view, similar to Figure 3 but on a larger scale, of the adjustable device for engaging the drill bit, and shows the milling cutter in section.

Similar reference numerals are employed throughout the specification to denote similar parts in the different figures of the drawings.

The construction shown in the drawings comprises a strong cast iron main frame 11 constituting a housing for a motor 12 (which is conveniently an electric motor) for driving the milling cutters of the machine. The housing 11 is in the form of a tunnel-shaped member having a rigid base frame 13, and a motor control and motor starter are provided at 14 on one side of the main frame 11 towards the upper part thereof. At each end of the frame 11 there is provided an upstanding part 15 upon which there is securely mounted a pillar or plummer block 16 forming an anti-friction ball bearing for a main driving shaft 17 for the milling cutters 18 provided on the shaft 17 adjacent to the plummer blocks 16 on portions of the shaft 17 formed as spindles 31 and overhanging said plummer blocks 16. The main driving shaft 17 is provided at a central portion between the two plummer blocks 16 with a pulley keyed to the shaft and driven by means of V-belting from the motor 12 housed in the main frame. A four horse-power motor is found sufficient to drive the machine and the motor is conveniently accommodated on an adjustable base plate 19. The drive from the motor 12 is by means of the V-belting aforesaid which passes through a suitable hole in the main frame 11, which hole is provided in the construction shown in Figure 1 with a surrounding upstanding guard 20 for the belt. The guard 20 is surmounted by a pair of guard members 21 enclosing the pulley on the shaft 17 and the belting passing thereto from the guard 20. The guard members 21 are conveniently mounted on the guard 20 and bolted together as at 22 in Figure 3.

The main shaft 17 carried by the ball bearing plummer blocks 16 has at its outer ends, spindles 31 upon which the milling cutters 18 are mounted, the spindles being such as to extend beyond and overhang the plummer blocks 16. Shields 23 carried by the main frame, are provided for each milling cutter so as to extend above and to one side of the said cutter, an overhanging portion 24 of the said guards being removably connected to the main portion of the guard 23 to allow of easy access to and removal of the milling cutter.

On one side of the main frame 11, and as shown in the drawings, on that side of the frame on which the motor control 14 is mounted, two brackets 25 are securely mounted at the opposite ends of the frame 11, which brackets are such as to have an upper part extending horizontally and outwardly from the frame, the brackets being spaced apart at their ends which are remote from the frame 11 by means of a tie-rod 26. These brackets carry rests 27, which will be described more fully hereinafter, for accommodating the shank of a drill steel, corresponding rests 28 being provided on the main frame 11 in relatively close proximity to the milling cutters for carrying that part of the drill steel relatively close to the drill bit which is to be milled.

The rests 27 for the drill steels, as will be seen more clearly from Figures 2 and 3, comprise a bracket 29 such as to slide longitudinally on a flange 30, provided at the upper horizontal edge of each bracket 25. The bracket 29 is provided with collars 32 for accommodating one arm 33 of a rod having a second arm 34 extending horizontally when the first arm 33 passes vertically through the collars 32. The arm 33 is provided with a slot 35 for accommodating a set screw 36 which secures the arm 33 in any desired position of vertical adjustment in the collars 32. The horizontal arm 34 carries on it two collar members 37 each formed at one end of a member (such as 38) having at the other a V-shaped rest 39 for accommodating a drill steel, each of which rests 39 can thus be adjusted horizontally on the arm 34 by means of the collars 37, set screws 40 being provided to secure the collars 37 in any desired position of adjustment on the arm 34 transversely of the projections 25. Of the pair of members 38 provided on the horizontal arm 34 one has a V-shaped rest 39 at a higher level than the other for the purpose explained hereinafter. The two drill rests so formed are placed side by side on the arm 34.

The drill rests 28 located nearer the milling cutter are similarly provided in pairs on a horizontal arm 41, which in the construction as shown in the drawings, is formed to extend transversely of the brackets 25, that is approximately parallel with the arm 34. The arm 41 extends from a plate 42 adjustably secured by means of a bolt 43 to one end of the main frame 11 on the outer end of an upstanding portion 15 previously referred to. Adjacent the plate 42 is a member 44 similarly and adjustably secured to the part 15 by a bolt 45, which member 44 carries a stop 46 extending transversely of the brackets 25 just below the milling cutter. The member 44 also carries on an upper surface a bracket 47 adjustably secured by a bolt 48 to allow of transverse movement of the bracket relatively to the part 44. The bracket 47 is provided with a conical member 49 for co-operation with a recess in the end drill bit, for example, with the end of the longitudinal axial hole in a hollow drill steel. The arrangement of the parts 44 and 47 is seen more clearly from Figure 4.

During use of the machine a drill steel 50 is placed in a pair of V-shaped rests 39, one of which rests is near the outer end of one of the brackets 25 and the other adjacent one of the milling cutters 18. The drill steel is arranged with the drill bit close to the milling cutter so that a slight longitudinal thrust on the drill can bring the drill bit into engagement with the cutter. The rests 39 are correctly aligned so that the drill bit is applied in correct relation to the cutter, the lower pair of rests 39, that is having parts 38 of the lesser size, are in this case first employed so that the V-shaped edge of the milling cutter, seen from Figure 4, can effect a sharpening operation upon two adjacent edges of a cruciform drill bit. The level of these two lower rests is adjusted so that the drill steel 50 can be thrust against the milling cutter to meet the latter at such a point in its periphery that the V-shaped edge of the cutter 18 correctly fits the V-shaped space between adjacent cutting edges of the bit. The drill steel is thrust against the cutter and the milling operation is continued until the drill bit meets the stop 46. The steel 50 is then retracted and given a quarter turn and the next pair of adjacent cutting edges similarly milled and the process again repeated until all cutting edges have been milled. For this operation of sharpening the cutting edges the temperature of the bit should not be below average forging heat when milling commences. This precaution serves to prevent excessive wear of the cutters.

After the cutting edges have been milled the drill steel 50 is transferred to a second higher pair of rests to a position 51 as seen in Figure 3. This second pair of rests are so aligned that the recess forming the end of the axial hole of the hollow drill steel engages the end of the conical member 49. The position of this member 49 is adjusted longitudinally and transversely as shown in Figure 3, to ensure a correct finished size of the drill bit. The milling cutter is provided with milling teeth on its sides as well as its edges the sides being dished somewhat as seen from Figure 4 which shows the milling cutter in section. The drill steel at 51 is again thrust longitudinally towards the cutter and the sizing operation proceeded with until the drill steel can move no further in a longitudinal direction owing to the fit of the conical member 49 in the axial hole of the steel. The steel is then given a quarter turn and the sizing operation repeated at the periphery of a further cutting edge and the process repeated until the drill bit has been correctly sized over its total periphery, which periphery forms the reaming edges of the drill bit. The conical member 49 is adjusted at a distance from the teeth of the cutter equal to half the desired gauge of the finished drill bit and the dished teeth of the cutter are shaped to produce the desired shape of the reaming edges of the bit.

It is to be noted that the apparatus has been described with reference only to the application of a single drill steel to a single milling cutter, but, as will be seen from Figure 1, the machine conveniently comprises a pair of milling cutters and associated apparatus for supporting drill steels so that two operatives may work with the single machine shown in Figure 1. Such operatives will handle the drill steels from that side of the machine on which the controls for the motor driving the machine are also located, whereby the use of the machine is facilitated.

I claim:

1. A drill bit sharpening machine comprising in combination a main frame, a hot milling cutter supported thereon, drill bit locating guides mounted on the frame to engage the drill bit at two points spaced apart in its length and to locate the bit in position relatively to the cutter for milling the cutting edges of the bit, a conically formed end centre in predetermined spaced relation to the cutter to engage an end recess provided in the head of the drill bit and to locate the drill bit head in position for milling the reaming edges thereof to size, and a bracket which supports said centre and is adjustably mounted on the main frame for movement towards and away from the milling cutter.

2. A drill bit milling machine according to claim 1 in which the bracket which supports the conically formed end centre is adjustably mounted on the main frame for movement relatively to the latter in at least two mutually perpendicular directions.

3. A drill bit sharpening machine according to claim 1 comprising also a drive for the milling cutter and a control device for the said drive mounted on that side of the main frame on which the drill bit locating guides are also mounted whereby an operator handling the drill bits may also operate the control device without change of position.

4. A drill bit sharpening machine comprising in combination a main frame, a hot milling cutter of disc like form having cutting teeth at the edge and on at least one side face of the disc, drill bit locating guides mounted on the frame to engage the drill bit at two points spaced apart in its length and to locate the bit with the cutting edges thereof applied for milling to the edge of the milling cutter, and an end centre carried by the frame to one side of the milling cutter in predetermined spaced relation thereto to engage and locate the drill bit head in position with the reaming edges thereof applied for milling to a side face of the milling cutter.

5. A drill bit sharpening machine according to claim 4 having the drill bit locating guides mounted along a line perpendicular to the axis of the milling cutter, and having a milling cutter with a V-shaped edge and cutting teeth on both conical surfaces of the said edge for milling cruciform cutting edges of a drill bit.

6. A drill bit sharpening machine according to claim 4 having a milling cutter with circular side faces which are slightly dished to produce reaming edges on a drill bit radially displaced from the axis of the bit to a greater extent at their forward ends as compared with the said radial displacement at the rearward end of the said reaming edges.

JAMES RULE.